(Model.) 2 Sheets—Sheet 2.
C. RAUB.
VENTILATING AND FIRE EXTINGUISHING APPARATUS.
No. 244,305. Patented July 12, 1881.
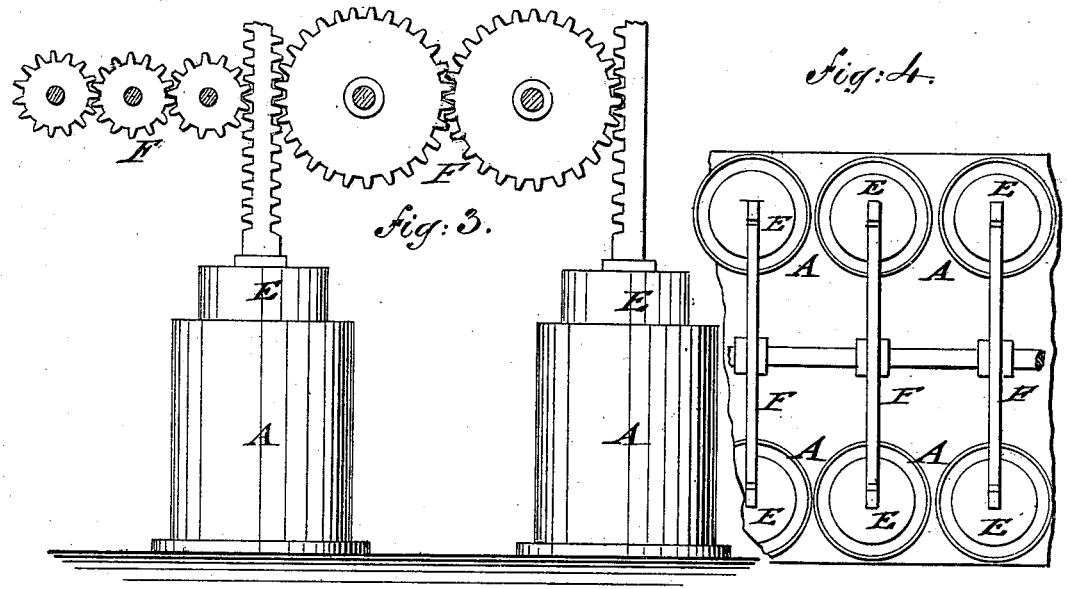
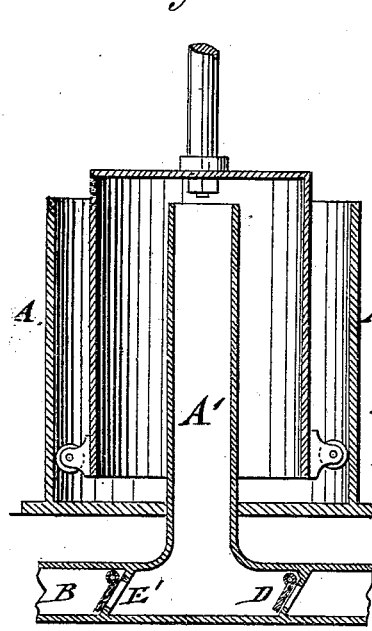
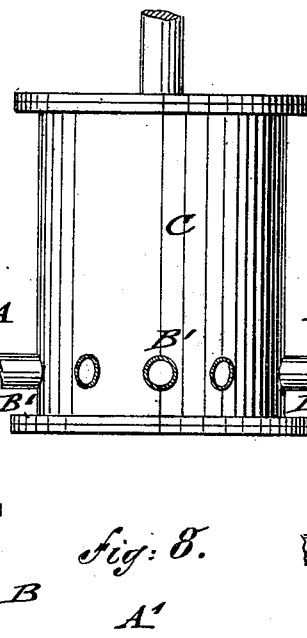
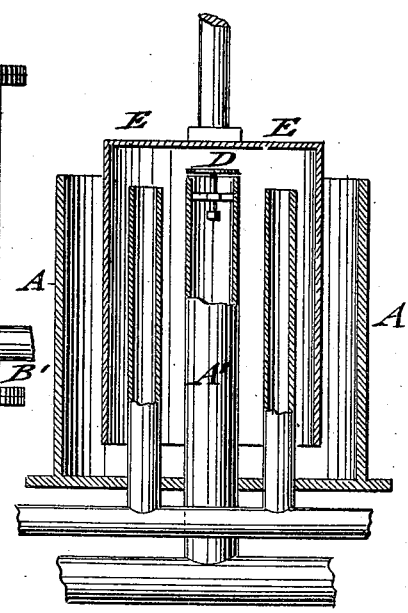
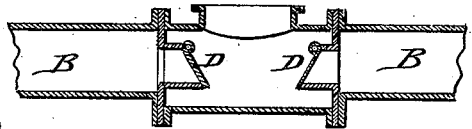
WITNESSES:
Carl May
Otto Risch
INVENTOR
Christian Raub
BY Paul Goepel
ATTORNEY

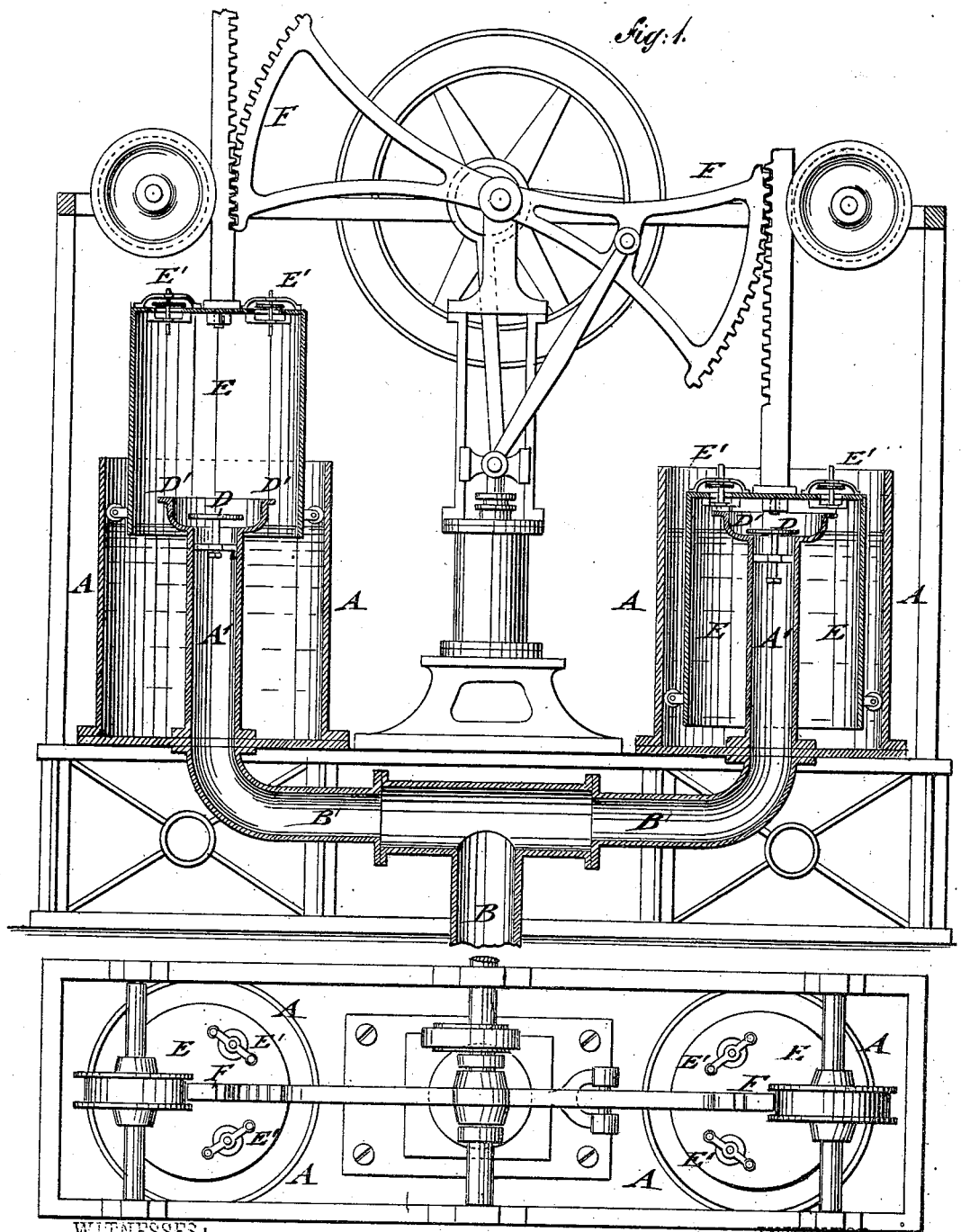

UNITED STATES PATENT OFFICE.

CHRISTIAN RAUB, OF ST. LOUIS, MISSOURI.

VENTILATING AND FIRE-EXTINGUISHING APPARATUS.

SPECIFICATION forming part of Letters Patent No. 244,305, dated July 12, 1881.

Application filed January 26, 1881. (Model.)

*To all whom it may concern:*

Be it known that I, CHRISTIAN RAUB, of St. Louis, in the county of St. Louis and State of Missouri, have invented certain new and useful Improvements in Ventilating and Fire-Extinguishing Apparatus, of which the following is a specification.

This invention has reference to an improved apparatus for ventilating buildings, vessels, mines, and other structures in a rapid and efficient manner by exhausting the atmospheric air from the spaces to be ventilated by hydro-aerostatic pressure, the apparatus being constructed in suitable proportions placed at any suitable distance from the localities to be ventilated, and also capable of exhausting rapidly the air of any one room or rooms in case of fire, so as to extinguish the same without water or chemicals, and without the destruction incidental to the use of the latter.

The invention consists of one or more open tanks or vessels filled with water or other liquid, and provided with one or more valved stand-pipes, which are connected by a main and branch pipes with the spaces to be ventilated. Within the tank or tanks is guided a tubular plunger, which is open at the bottom and provided at its closed top with tightly-fitting discharge-valves. To the tubular plunger or plungers vertically-reciprocating motion is imparted by any suitable mechanism, so that by the lifting of the plunger a vacuum is created therein. This vacuum tends to displace the air in the rooms to which the apparatus is connected, so as to ventilate the same, and, if the apparatus is worked with increased speed, even to exhaust the same, so as to extinguish the fire.

In the accompanying drawings, Figure 1 represents a vertical longitudinal section of my improved apparatus for ventilating spaces and extinguishing fires therein. Fig. 2 is a plan view of the same; Fig. 3, a sectional side elevation, showing a modified motion-transmitting mechanism. Fig. 4 is a plan view, showing a battery of ventilating apparatus. Figs. 5 and 6 show modified constructions of my apparatus. Fig. 7 is a side elevation of a receiver to connect the main and branch pipes; and Fig. 8 is a special arrangement of the valve in the main pipe.

Similar letters of reference indicate corresponding parts.

Referring to the drawings, A represents a tank or vessel, preferably of cylindrical shape and of suitable material, the dimensions of which are in proportion to the cubical contents of the rooms or spaces to be ventilated. The tank A is closed at the bottom and open at the top, and filled up to a certain level with water or other liquid, in winter preferably with glycerine or other non-congealable liquid. At the inside of the tank are one more stand-pipes, A', which pass through the bottom of the same and are connected with a main conduit-pipe, B, that is connected by branch pipes B' directly to the spaces to be ventilated, or at different levels or distances to cylindrical receivers C, as shown in Fig. 7. The stand pipe or pipes A' extend above the level of the liquid in the tank A, and are provided at their upper ends with a tightly-fitting valve, D, which is inclosed by an annular cage, D'. The cage D' serves as a guard to prevent the water from entering into the stand-pipe A' by the rising or falling of the liquid in the tank.

Within the tank A is guided, by means of exterior rollers, or otherwise, a hollow plunger, E, which is open at the bottom and closed at the top, the latter being provided with one or more discharge-valves, E'. The plunger E is alternately raised or lowered in the tank A by means of any suitable mechanism, F, which imparts the required vertically-reciprocating motion to the same. The valves E' of the plunger E are kept tightly closed during the ascending motion of the same, so that a vacuum is formed therein, which tends to exhaust the air in the spaces to be ventilated. By the descending motion of the plunger the air is compressed and discharged through the valves E'. The plunger may be set in motion by hand, steam, or other power, two apparatus being preferably worked in connection, either by a walking-beam having toothed segments which engage the rack-shaped plunger-rods, as shown in Fig. 1, or by transmitting-gearing, as shown in Fig. 3, or by any other equivalent means.

By arranging the apparatus in pairs and working them alternately by an oscillating lever or beam the operating mechanism is balanced, and consequently little power required, as only the friction of the fulcrum of the oscillating beam has to be overcome.

For ventilating larger spaces a battery of exhausting apparatus is coupled together and operated by a common beam, by which the rapid and continuous exhaustion of the air is obtained. This takes place by the alternate action of the vertically-reciprocating plungers, which draw in the air through the branch pipes and valved main during the ascending motion of the plunger, and expel the air to the outside during the descending motion of the same.

The valves of the stand-pipe A' and plunger E may also be arranged at the point of connection of the stand-pipe and main, as shown in Fig. 5; or in place of the plunger-valves discharge-pipes at the inside of plunger, as shown in Fig. 6, may be used, or any other equivalent valve arrangement be employed.

The apparatus may be worked at greater or less speed, according as the same is required either for ventilation or for extinguishing fires. In the latter case the openings of all the spaces except the one in which the fire is in progress, are closed, and the force of the apparatus employed to evacuate the air from that room as quickly as possible, so as to render the progress of the fire impossible and extinguish it by the lack of air.

Having thus described my invention, I claim as new and desire to secure by Letters Patent—

1. A hydro-aerostatic ventilator and fire-extinguisher consisting of a tank filled with a suitable liquid, of a valved stand-pipe extending from the bottom of the tank to a point above the level of the liquid, of a valved hollow plunger, and of mechanism whereby vertically-reciprocating motion is imparted to the plunger, substantially as set forth.

2. A hydro-aerostatic ventilator and fire-extinguisher consisting of a tank filled with a suitable liquid, of a valved stand-pipe extending from the bottom of the vessel to a point above the liquid, of a valved hollow plunger, of mechanism whereby vertically-reciprocating motion is imparted to the plunger, and of a system of exhausting-pipes connected with the stand-pipe of the tank, substantially as specified.

3. In a ventilating apparatus, a vessel or tank filled with a suitable liquid and provided with a stand-pipe which extends from the bottom of the vessel to a point above the level of the liquid, and is provided at the upper end with an annular guard-plate or cage, substantially as set forth.

In testimony that I claim the foregoing as my invention I have signed my name, in presence of two witnesses, this 24th day of January, 1881.

CHRISTIAN RAUB.

Witnesses:
PAUL GOEPEL,
CARL KARP.